United States Patent [19]

Emme

[11] 4,236,741
[45] Dec. 2, 1980

[54] METHOD AND MEANS FOR DISPOSING OF ANIMAL WASTE

[75] Inventor: Harry W. Emme, Jensen Beach, Fla.

[73] Assignee: Clifton T. Hunt, Jr., Charlotte, N.C.; a part interest

[21] Appl. No.: 967,881

[22] Filed: Dec. 8, 1978

[51] Int. Cl.³ .............................................. A01K 29/00
[52] U.S. Cl. ................................................. 294/1 BB
[58] Field of Search ............... 294/1 BB, 1 BA, 14 R, 294/57; 15/257.1, 257.6; 248/99, 100, 101; 119/1 R

[56] References Cited

U.S. PATENT DOCUMENTS

| | | | |
|---|---|---|---|
| 2,763,506 | 9/1956 | Denker et al. | 294/57 |
| 3,872,831 | 3/1975 | Cassidy | 294/1 BB |
| 4,042,269 | 8/1977 | Skermetta | 294/1 BB |

Primary Examiner—James B. Marbert

[57] ABSTRACT

A portable and easily handled collection device is manually carried by a person walking a dog and a disposable container which forms a part of the collection device is positioned beneath the dog when it haunches for excrement. The droppings are caught in the disposable container instead of falling on the ground. The disposable container is easily removed from the collection device and discarded as waste in a suitable sanitary manner. The collection device comprises a foldable handle and means at one end of the handle for releasably supporting a disposable container.

6 Claims, 6 Drawing Figures

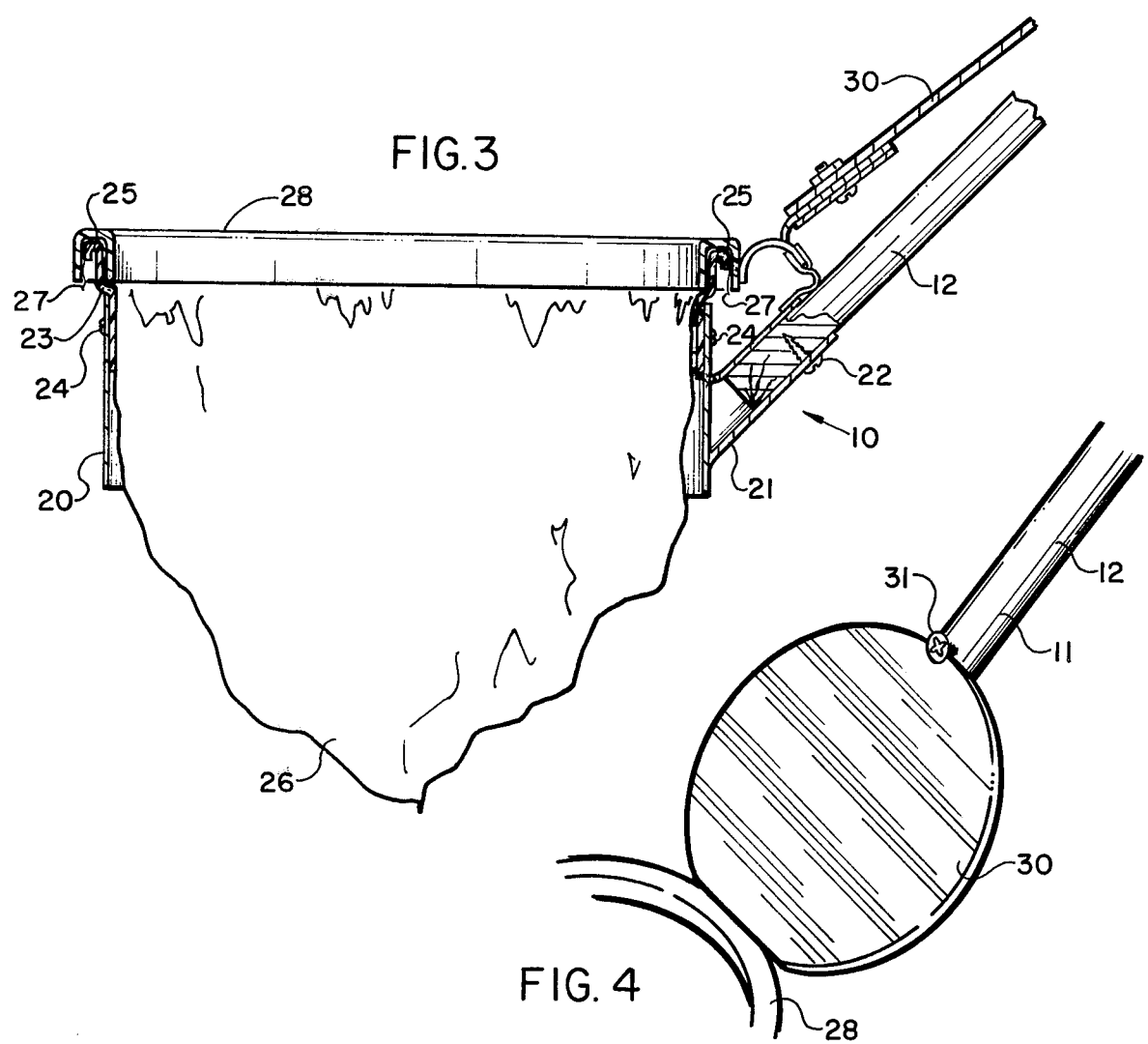
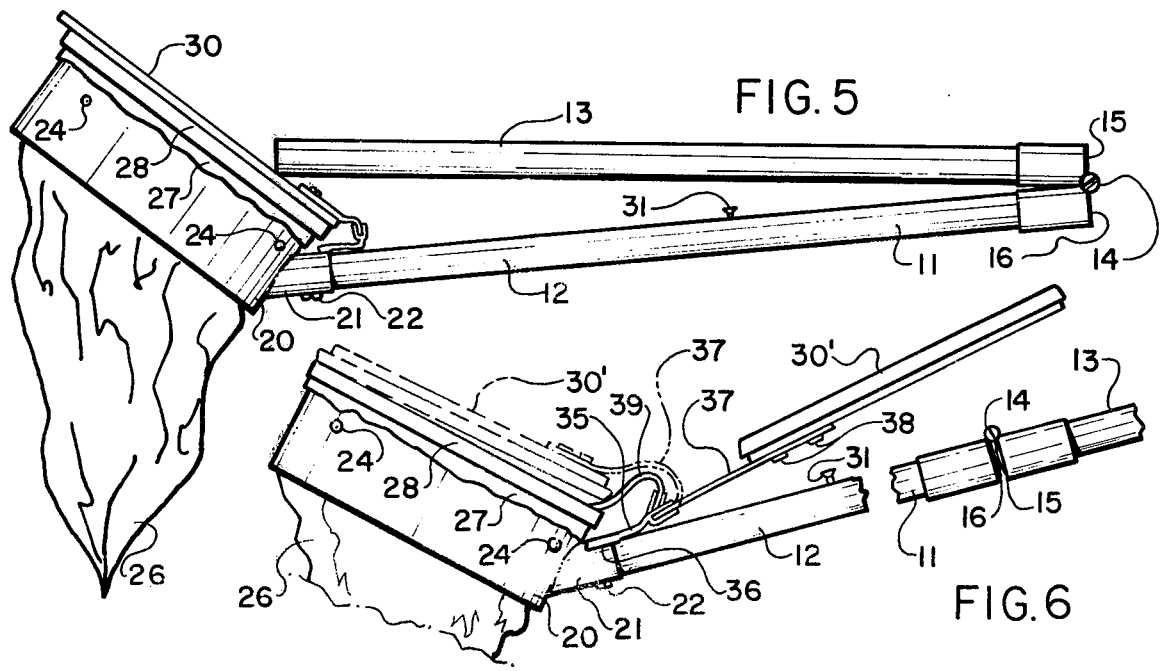

METHOD AND MEANS FOR DISPOSING OF ANIMAL WASTE

BACKGROUND OF THE INVENTION

As is well known, the removal of dog droppings from city streets has become such a problem that New York, San Francisco and possibly other cities have passed ordinances requiring the owner of the dog to remove the droppings left by their pets. The removal is done in a variety of ways, such as picking up the droppings with a paper towel and depositing them in a paper or plastic bag preparatory to the ultimate disposal. The patented art discloses a harness supported collection device which is carried completely by the pet rather than by the person. Such a device is shown in U.S. Pat. No. 3,875,903 issued Apr. 8, 1975 to Frank O. Sarvary. U.S. pat. No. 3,656,459 issued Apr. 18, 1972 to Lewis Missud and U.S. Pat. No. 3,792,687 issued Feb. 19, 1974 to Alexander Ehrman show similar devices supported by the pet and not by its owner. In each of these prior art devices it is necessary for the owner to attach the collection device to his pet and to remove it after use, in addition to disposing of the filled container. The handling of the collection device and the fitting and adjustment of it to the pet are unpleasant manual tasks which are eliminated by means of the present invention.

SUMMARY OF THE INVENTION

According to the present invention the collection device is entirely handled by the owner and nothing is attached to the pet. The owner and his pet walk in the conventional manner and when the dog haunches for excrement the owner arranges the collection bag beneath the haunching dog in position to catch the droppings as they fall. After the droppings have been collected in the bag the bag is removed from the collection device and disposed of in a sanitary manner. The handle of the collection device may then be folded and easily carried for the rest of the walk.

BRIEF DESCRIPTION OF THE DRAWINGS

FIG. 3 is an enlarged fragmentary view, partially in section, of the operative end of the collection device and illustrating the manner in which a removable container is supported on the collection device;

FIG. 4 is an enlarged fragmentary view with parts broken away illustrating the manner in which a hinged top for the collection device is supported in open position when in use;

FIG. 5 is an elevation of the collection device in folded inoperative position; and FIG. 6 is an elevation of the operative end portion of the collection device, illustrating a modified form of cover attachment.

DETAILED DESCRIPTION OF THE INVENTION

Figure 1:
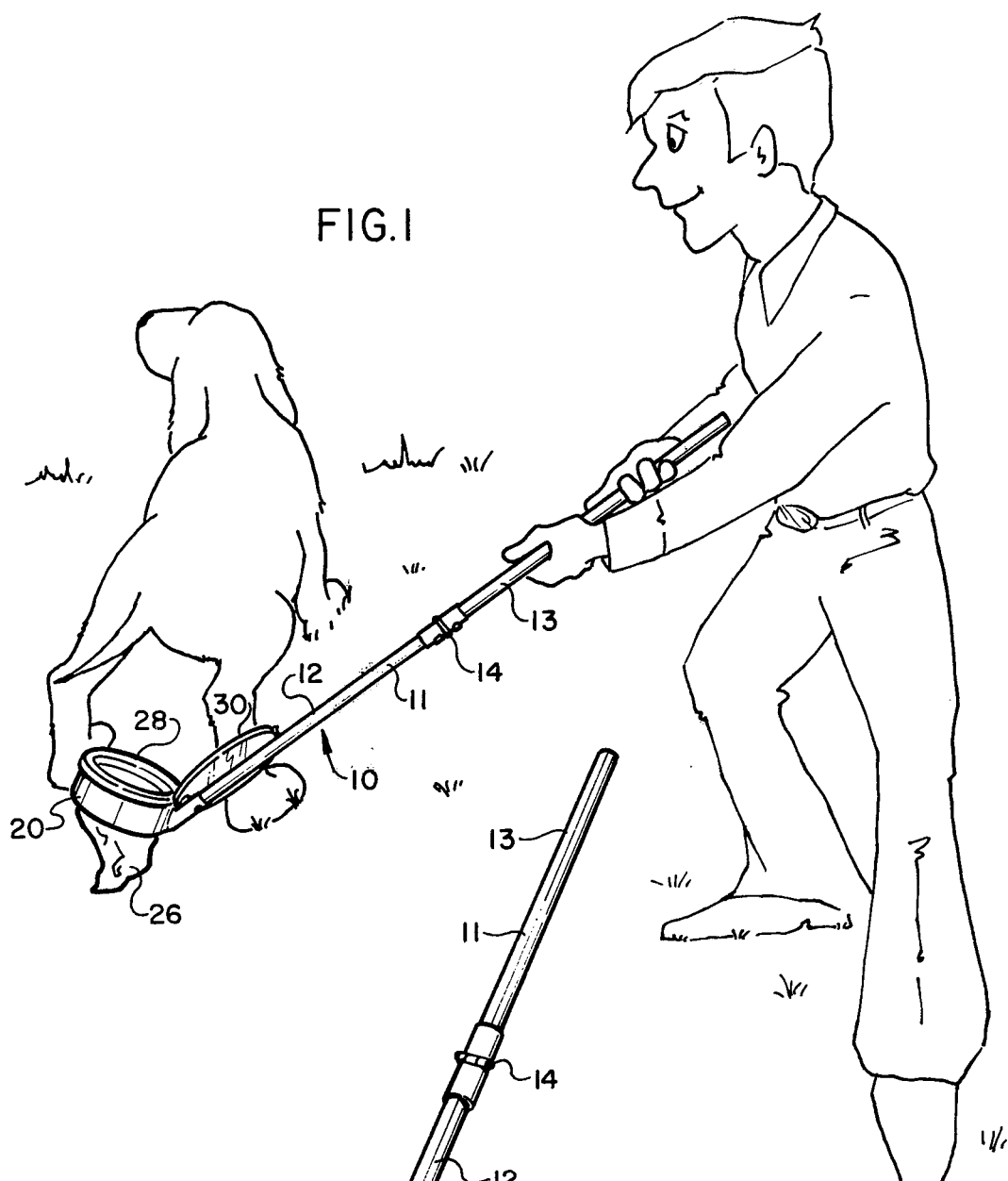
FIG. 1 is a perspective view of a pet owner and his pet illustrating the manner in which the owner holds the collection device in operative position beneath the dog.
Figure 2:
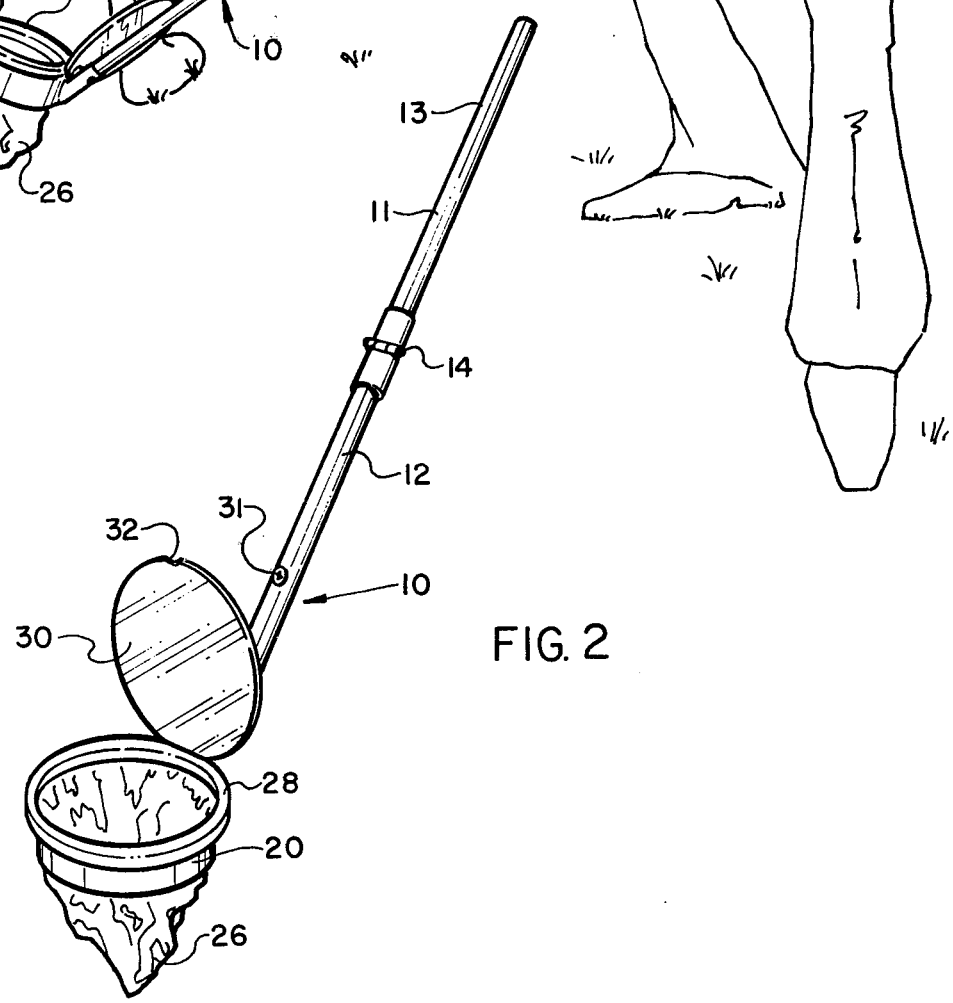
FIG. 2 is a perspective view of the collection device in extended operative position.

Referring more specifically to the drawings, the reference numeral 10 broadly indicates a collection device comprising a foldable handle 11 which includes an operative end portion 12 and a free end or handle portion 13. A butt hinge 14 is suitably fixed to the proximal end portions of operative end 12 and free end 13 of handle 11. The pivotal connection of hinge 14 is preferably arranged across the top of the handle in the operative position of FIGS. 1 and 2 so that the free end portion 13 may be folded over the operative end portion 12 when not in use, as shown in FIG. 5. The hinge 15 includes butt plates 15 and 16 (FIG. 5) which move into abutting relation when the free end portion 13 is folded to the right in FIG. 5 to assume the operative position of FIGS. 1 and 2. The butt plates 15 and 16 provide support for the collection device when the handle 11 is unfolded into its extended position and yet permit instant and convenient folding of the free end portion 13 for easy and convenient carrying when the collection device is not in use.

A circular support frame 20 having a socket 21 formed integral therewith is fixed to the outer end of operative end portion 12 of handle 11 as by screw 22 or other suitable retaining device. The support frame 20 is of circular configuration or any desired configuration corresponding to that of a retaining rim 23 extending upwardly from support frame 20 in FIG. 3 and secured thereto as by screws 24 or by any other desired means.

The retaining rim 23 is preferably formed from smooth plastic and is attached to the inner surface of support frame 20 as most clearly seen in FIG. 3. The retaining rim 23 extends upwardly from the inner surface of support frame 20 and thence outwardly across the upper edge of frame 20 and upwardly therefrom a short distance before being folded on itself to form a smooth upper edge as at 25 in FIG. 3.

The inner diameter of the retaining rim 23 conforms with the diameter of any desired commercially available disposable plastic bag, which is preferably opaque to conceal the nature of its contents when in use for its intended purpose. In practice, a disposable plastic bag 26 is placed inside retaining rim 23 with the closed end of bag 26 beneath the rim 23 in FIG. 3. The open end portions 27 of bag 26 are folded outwardly over the upper edge 25 of rim 23 and then downwardly. The open end portions 27 of bag 26 are then supported about rim 23 by a retaining ring 28 which frictionally binds the ends of bag 26 between rim 23 and ring 28. Ring 28 is preferably made from plastic and is of inverted U-shaped cross-sectional configuration when positioned about the end portions 27 of bag 26 and rim 23 (FIG. 3).

A cover 30 is pivotally connected to operative end portion 12 of handle 11 adjacent or integral with socket 21. The cover may be folded back against operative end portion 12 of handle 11 and supported in open position by frictional engagement with a screw 31 or other suitable stop means extending from handle 11 (FIG. 4). The cover may be closed over the bag 26 after feces has been deposited therein and supported by retaining rim 28.

In use, the owner of a pet may attach an empty bag 26 about the rim 23 and hold it there by positioning the retaining ring 28 over the free ends 27 of bag 26 before beginning a walk with the owner's pet. The owner carries the entire collection device with him on his walk and when the dog haunches for excrement the owner moves cover 30 to its open position and retains it there by registering notch 32 with stop means 31. Free end portion 13 of handle 11 is folded from the closed position of FIG. 5 to the extended position of FIGS. 1 and 2 and the owner is thus enabled to quickly position the bag 26 beneath the dog as it haunches and to catch the excrement in the bag 26 instead of permitting it to fall on the ground. Thereafter, the cover is moved into the closed position of FIG. 5 and handle portion 13 is folded into engagement with cover 30 to hold it in closed position while the collection device is carried to a point of convenient and sanitary disposal of bag 26 and its contents.

Alternatively, with reference to FIG. 6, the cover 30' may be attached to the operative end portion 12 of handle 11 by a bracket 35 attached to socket 21 as by solder 36. A pair of elongated flexible and resilient straps 37 extend from the bracket 35 to the top wall of cover 30', where they are attached as by brads 38. A strap 39 extends from bracket 35 and engages the edge of retaining ring 28 to conveniently keep the ring 28 accessible while bag 26 is being removed and replaced. The cover 30' of FIG. 6 is normally carried in the closed dotted line position of FIG. 6 with the free end of handle 13 resting on the upper surface of cover 30', just as shown with the cover 30 in FIG. 5.

When it is desired to put the device into use the handle portion 13 is moved to the extended position of FIG. 6. When the handle portion 13 is removed from the cover 30' the resilient and flexible straps 37 return to their normal position and move the cover 30' to the open position shown in FIG. 6 automatically and without manual manipulation by the owner. The automatic opening of the cover 30' when the handle is moved from the folded to its extended position enables the immediate positioning of the container for use. The screw or stop means 31 provides a convenient means for holding the retainer ring 28 out of the way when the disposable bag 36 is being removed and replaced.

There is thus provided an effective and efficient method and means for disposing of animal waste which frees the owner from any cumbersome manual and menial activities while at the same time keeping the environment clean and promoting the health of others.

In the drawings and specification specific terms have been employed in describing the invention but they are used in a descriptive sense only and not for purposes of limitation.

I claim:

1. Apparatus for disposing of animal waste comprising a handle, a support frame fixed to one end of the handle, a disposable bag having a closed end and an open end carried by said frame, means releasably supporting the bag with its open end around the frame and its closed end beneath the frame, said handle including an operative end portion and a free end portion, means pivotally connecting the said portions of the handle at their proximate ends, said means releasably supporting the bag comprising a rim extending above the support frame and about the open end portion of a bag carried by said frame and a retaining ring extending about the rim and frictionally pressing the open end portion of the bag against the outer surface of the rim, a cover pivotally mounted on the handle and movable into closed position covering the open end of the bag, and means for moving the cover into open position responsive to unfolding the handle toward its extended position.

2. Apparatus according to claim 1 wherein said cover is resiliently supported in open position by the operative end portion of said handle.

3. Apparatus according to claim 2 wherein said cover is resiliently supported in open position by the operative end portion of said handle.

4. Apparatus according to claim 3 wherein said cover is resiliently supported in open position by the operative end portion of said handle and in substantially parallel relation to said operative end portion of the handle.

5. Apparatus for disposing of animal waste comprising a handle, a support frame fixed to one end of the handle, a disposable bag having a closed end and an open end carried by said frame, means releasably supporting a bag with its open end around the frame and its closed end beneath the frame, said means releasably supporting the bag comprising a rim extending above the support frame and about the open end portion of a bag carried by said frame and a retaining ring extending about the rim and frictionally pressing the open end portion of the bag against the outer surface of the rim, a cover pivotally mounted on the handle and movable into closed position covering the open end of the bag, and means for moving the cover and supporting it in open position responsive to manipulation of the handle.

6. Apparatus according to claim 5 wherein said cover is supported in open position by the handle.

* * * * *